US 10,065,800 B2

(12) United States Patent
Auf Der Maur (10) Patent No.: US 10,065,800 B2
(45) Date of Patent: Sep. 4, 2018

(54) TRANSPORT BAG FOR TRANSPORTING AND/OR STORING ARTICLES, AND TRANSPORT DEVICE COMPRISING SAID TRANSPORT BAG

(71) Applicant: FERAG AG, Hinwil (CH)

(72) Inventor: Konrad Auf Der Maur, Gossau (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/257,617

(22) Filed: Sep. 6, 2016

(65) Prior Publication Data

US 2017/0088302 A1    Mar. 30, 2017

(30) Foreign Application Priority Data

Sep. 24, 2015 (CH) .................................. 1386/2015

(51) Int. Cl.
*B65G 9/00* (2006.01)
*B65B 43/42* (2006.01)
(Continued)

(52) U.S. Cl.
CPC .............. *B65G 9/002* (2013.01); *B65B 43/42* (2013.01); *B65B 67/1205* (2013.01);
(Continued)

(58) Field of Classification Search
CPC ........ B65G 9/002; B65G 9/004; B65G 17/20; B65G 19/025; B65G 2201/0238; B65B 43/42; B65B 67/1205; B65B 67/1266; B65B 67/1238; B65B 67/1211; B65B 67/1222; B65B 67/1244; B65D 33/14
See application file for complete search history.

(56) References Cited

U.S. PATENT DOCUMENTS 2,078,438 A * 4/1937 Baxter ................... D06F 5/002
248/100
3,807,314 A 4/1974 Slemmons
(Continued)

FOREIGN PATENT DOCUMENTS

DE    1 228 087 B    11/1966
DE    103 54 419 A1    6/2005
(Continued)

*Primary Examiner* — Gene O Crawford
*Assistant Examiner* — Keith R Campbell
(74) *Attorney, Agent, or Firm* — Pauly Erickson & Kottis (57) ABSTRACT

A transport bag (15) for transporting and/or storing articles comprises a front wall (21b) and a back wall (21a) that are flexibly connected to one another via a bottom section (21c) so as to be movable back and forth between a first configuration in which the front wall and back wall form an upwardly open bag that can be filled from above, and a second configuration in which the front wall and back wall lie closely alongside one another and form a bag that is folded together, wherein the back wall (21a) is extended upward above and beyond the height of the front wall (21b) with a support section (15a) for fastening the transport bag (15) to a transport device (10.2). Easy filling and emptying of the transport bag (15) is achieved by providing an opening (16, 19, 20) that automatically brings the transport bag (15) into the first configuration and keeps the transport bag there, and allows a deliberate shift from the first configuration into the second configuration.

19 Claims, 6 Drawing Sheets

(51) Int. Cl.
   *B65B 67/12*      (2006.01)
   *B65D 33/14*      (2006.01)
   *B65G 19/02*      (2006.01)
   *B65G 17/20*      (2006.01)

(52) U.S. Cl.
   CPC ...... *B65B 67/1211* (2013.01); *B65B 67/1222* (2013.01); *B65B 67/1238* (2013.01); *B65B 67/1244* (2013.01); *B65B 67/1266* (2013.01); *B65D 33/14* (2013.01); *B65G 9/004* (2013.01); *B65G 17/20* (2013.01); *B65G 19/025* (2013.01); *B65G 2201/0238* (2013.01)

(56) References Cited

U.S. PATENT DOCUMENTS

| | | | |
|---|---|---|---|
| 3,827,471 A * | 8/1974 | Gregory | B65D 88/1668 |
| | | | 222/181.3 |
| 4,140,163 A | 2/1979 | Usner | |
| 4,411,947 A * | 10/1983 | Heynhold | B32B 25/10 |
| | | | 442/228 |
| 8,490,774 B2 | 7/2013 | Janzen | |
| 8,607,963 B2 | 12/2013 | Wend et al. | |
| 8,672,118 B2 * | 3/2014 | Janzen | B65G 47/61 |
| | | | 198/678.1 |
| 8,790,047 B2 * | 7/2014 | Valerino, Sr. | B65G 51/04 |
| | | | 406/110 |
| 9,630,751 B1 * | 4/2017 | Otto | B65G 17/20 |
| 2015/0225177 A1 | 8/2015 | Schonenberger | |
| 2016/0159558 A1 * | 6/2016 | Schneuing | B65D 29/00 |
| | | | 206/282 |
| 2017/0015505 A1 * | 1/2017 | Schoenenberger | B65G 17/20 |

FOREIGN PATENT DOCUMENTS

| | | | |
|---|---|---|---|
| DE | 10 2004 018 569 A1 | 11/2005 | |
| DE | 10 2008 026 720 A1 | 12/2009 | |
| DE | 10 2010 033 905 A1 | 2/2012 | |
| DE | 10 2011 101 987 A1 | 11/2012 | |
| DE | 10 2012 012 331 U1 | 3/2013 | |
| DE | 10 2012 212 518 A1 | 2/2014 | |
| EP | 2 708 478 A1 | 3/2014 | |
| EP | 2 708 478 B1 | 11/2014 | |
| WO | WO-2012156451 A1 * | 11/2012 | ............ B65G 17/20 |

* cited by examiner

TRANSPORT BAG FOR TRANSPORTING AND/OR STORING ARTICLES, AND TRANSPORT DEVICE COMPRISING SAID TRANSPORT BAG

CROSS-REFERENCE TO RELATED APPLICATIONS

Swiss Patent Application 01386/2015, filed 24 Sep. 2015, Swiss, the priority document corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention relates to the field of transport technology, and pertains to a transport bag according to the preamble of claim 1, as well as a transport device comprising said transport bag.

Discussion of Related Art

In automated warehouses, expansive production facilities, and more generally in the transport of goods, it is necessary for conveyed items or goods to be accommodated in suitable conveyed item containers—in particular, transport bags, which must then be transported, for example, via a suspended conveyor device to the destination therefor and unloaded there. For this purpose, diverse conveyed item containers or transport bags and associated suspended conveyor devices or transport devices have previously been developed and designed.

DE 10 2012 212 518 A1 discloses a conveyed item container for transporting conveyed items in a suspended conveyance device, wherein the conveyed item container is configured as a suspended bag having two side wall elements that delimit a conveyed item receiving region therebetween, are connected to one another via a flap hinge assembly and can be folded about a folding axis in order to open and close the suspended bag, and having a suspension means for suspending from a suspended conveyor device, characterized in that at least one first one of the two side wall elements has a frame and a conveyed item position-fixing element which is held by the frame and is intended and adapted in order to exert on the conveyed item a force counteracting a slipping of the conveyed item from the position thereof in the suspended bag or/and form a multi-sided barrier counteracting a slipping of the conveyed item from the position thereof in the suspended bag, with a suspended bag that is closed and loaded with a conveyed item.

Document DE 10 2011 101 987 A1 describes a transport bag for conveying a conveyed item in a conveyance system, in particular, a suspended conveyance system, with a support part that is configured for accommodation on a conveyance line of the conveyance system, with an auxiliary loading means, wherein the auxiliary loading means has a closure flap having a handling tab comprising a clamping section, wherein the support part has a clamping device comprising a clamping lever that can be displaced between a holding position, in which a holding force acts on the clamping section, and a release position, and wherein the clamping lever is coupled to the clamping section in the holding position in such a manner that the weight of the accommodated conveyed item increases the holding force.

Document DE 10 2004 018 569 A1 discloses a collecting device for accommodating objects, in particular, articles of clothing, in sorted collection of objects, characterized by a collection bag having essentially one frame structure provided with a take-up element that can be integrated into a conveyance device, and a bag pouch suspended from the frame structure, wherein the take-up element and the frame structure are pivotable relative to one another about an axis lying transverse to the direction of conveyance, and wherein the bag pouch is opened when the frame structure is arranged horizontally and the bag pouch is folded together and essentially closed when the frame structure is arranged vertically.

Document DE 20 2012 012 331 U1 discloses a conveyed item container for transporting a conveyed good in a suspended conveyance device, wherein the conveyed item container is configured as a suspended bag having a conveyed good accommodation region delimited on one side by a side wall element and having a suspension means for suspension from a suspended conveyance device, wherein the suspension means is fastened to the side wall element so as to be pivotable about a pivoting device defining a pivot axis, characterized in that the conveyed item accommodation region is delimited on another side by a conveyed item fixation element, wherein the conveyed item position fixation element is connected to the suspension means in such a manner that when the suspension means is pivoted relative to the side wall element from a transport position into an opening position, the conveyed item position fixation element can be removed from the side wall element so as to open the conveyed item accommodation region.

Document U.S. Pat. No. 8,490,774 B2 discloses a loading station for transport bags transported in an overhead conveyor system, which loading system comprises an upper supply rail for the transport bags, a vertical conveyor which adjoins the supply rail for moving the transport bags into a lower loading position, a device for opening the transport bags in the loading position, and a lower discharge rail which adjoins the vertical conveyor for discharging the transport bags from the loading position.

Document EP 2 708 478 A1 describes a carrier bag for a suspended conveyor device for the hanging transport of objects, comprising a holding frame, a bag pouch which hangs from the holding frame and by which objects to be transported can be received, and a suspension member which is connected to the holding frame and by means of which the carrier bag can be suspended from the suspended conveyor device, so as to be transported by the suspended conveyor device in a suspended way, characterized in that the bag pouch comprises a first and second pouch portions each comprising a first pouch end portion connected to the holding frame and a second pouch end portion turned away from the holding frame, wherein the second pouch end portions are connected to each other by a hinge mechanism which can be brought into an unloading position in which the second pouch end portions are arranged at a distance from each other, so that the bag pouch is provided with an outlet opening formed between the second pouch end portions for emitting objects, and which can be brought into a loading position in which the second pouch end portions are arranged adjacent to each other, so that the outlet opening is closed and the bag pouch can receive objects.

Usually, the previously proposed transport bags are designed either so as to be rigid and permanently open, or so as to close automatically as soon as the transport bags are filled or aligned with the force of gravity.

As a consequence thereof, the transport bags either are not compressed in a space-saving manner when not in use, or must be kept open with considerable effort when loaded and unloaded.

SUMMARY OF THE INVENTION

The present invention therefore addresses the problem of providing a transport bag that automatically transitions into and remains in the open state, but, at the same time, can be folded together so as to save space when not in use.

The present invention also addresses the problem of providing a transport device comprising said bag.

The problems are solved by the features of claims 1 and 17.

The transport bag according to the invention for transporting and/or storing articles comprises a front wall and a back wall that are flexibly connected to one another via a bottom section so as to be movable back and forth between a first configuration in which the front wall and back wall form an upwardly open bag that can be filled from above, and a second configuration in which the front wall and back wall lie closely alongside one another and form a bag that is folded together, wherein the back wall is extended upward above and beyond the height of the front wall with a support section for fastening the transport bag to a transport device.

The transport bag is characterized in that an opening and opening means are provided that automatically bring the transport bag into the first configuration and keep the transport bag there, and that allow a deliberate shift from the first configuration into the second configuration.

According to one embodiment of the present invention, the opening means comprise an opening bracket that connects the back wall and the front wall to one another and is mounted so as to be pivotable on the back wall and on the front wall respectively in such a manner as to be pivoted, originating from the second configuration, from an inclined second position into a less inclined first position due to the intrinsic weight thereof, thereby bringing the transport bag into the first configuration and keeping the transport bag there.

The opening bracket may then be guided outward around the transport bag and mounted onto the outside of the back wall and outside of the front wall, respectively, so as to be pivotable in a transverse tunnel loop.

The opening bracket may be configured as a rectangular, dimensionally stable metal bracket. The metal bracket must then be sufficiently hard to fulfill the automatic opening function through the intrinsic weight, due to the force of gravity. The dimensional stability of the opening bracket ensures that the front and back walls of the transport bag are not displaced laterally relative to one another, but rather can only be moved onto one another or away from one another.

A round cross-section of the metal bracket may advantageously enhance the mobility of the opening bracket in the tunnel loops.

The opening bracket may be mounted so as to be vertically mobile in the tunnel loops. The movement of the bracket can then be more readily adapted to different states of fullness of the transport bag.

In particular, one of the tunnel loops may be configured so as to be foldable about a horizontal axis, in order to allow additional freedom of movement for the opening bracket.

According to another embodiment of the present invention, the transport bag is closed laterally by side walls, and has a bottom as the bottom section.

According to another embodiment of the present invention, the transport bag maybe opened downward, wherein means for closing this opening are provided.

According to another embodiment of the present invention, the transport bag is closed laterally by side walls, and has a bottom as the bottom section, wherein the bottom of the transport bag is configured so as to be hinged downward, and wherein one or more closure tabs with which the bottom can be fixed in the closed state is/are provided. In particular, the bottom may be pivotably articulated at the lower edge of the front side. The closure tabs, which may advantageously be configured as a hook-and-loop fastener, are attached, in particular, to the free longitudinal edge of the bottom and are folded against the back wall in order to close from the outside. The closure tabs may, however, also be attached to the lower edge of the back wall, and are then folded against the bottom in order to close from below.

Alternatively thereto, however, the transport bag may also be formed of a laterally open loop that forms a bottom section in the lower region.

Herein, retaining straps may be provided on opposite sides in the region above the opening bracket, the retaining straps connecting the front and back walls of the loop and delimiting the pivoting movement of the opening bracket.

According to another embodiment of the present invention, the transport bag has a protective, in particular, shock-absorbing, cover layer on the front wall and/or on the back wall. This protects articles transported in the bag against shocks if there are collisions between a plurality of transport bags in a railbound transport device. The cover layers may additionally also have an insulating effect.

According to another embodiment of the present invention, the transport bag is fitted with an information carrier that can be read from the exterior. This may be, for example, an optically readable information carrier such as a label having a barcode or QR code, or an information carrier that can be wirelessly, electronically read out, such as an MID. If the carrier can be read in and read out, then information about the transported bag contents can be stored thereon.

According to yet another embodiment of the present invention, the support section of the transport bag is provided with at least one fastening opening. The fastening opening may be used to suspend or bolt the transport bag, either stationarily or removably on a transport device (a carriage).

Two grommets that are at the same height and are spaced apart from one another may be provided as fastening openings. If the bag is fastened with the aid of the two grommets, the bag will also remain positionally stable in a transport device.

According to yet another embodiment of the present invention, the transport bag is made out of a flexible, in particular, fabric-reinforced, material. One example for this is an externally smooth, plastic-coated fabric, such as is used in different thicknesses, for example, for truck tarpaulins. However, it is also possible to use an uncoated fabric, a mesh, or a film as the bag material.

The transport device according to the present invention having one or more transport bags according to the present invention is characterized in that the transport bag(s) can be moved along a transport path while suspended with the support section on a carriage in a running rail or on a transport chain.

According to one embodiment of the transport device according to the present invention, the transport bag(s) is (are each) fastened to the carriage or to the transport chain at least two points that are spaced apart horizontally from one another.

The transport bag may then be removably fastened at the at least two points that are horizontally spaced apart from one another via a fastening device on the carriage or on the transport chain.

BRIEF DESCRIPTION OF SEVERAL VIEWS OF THE DRAWINGS

The present invention shall be described in greater detail below through embodiments, in connection with the accompanying drawings.

DESCRIPTION OF PREFERRED EMBODIMENTS

Figures 1A, 1B:
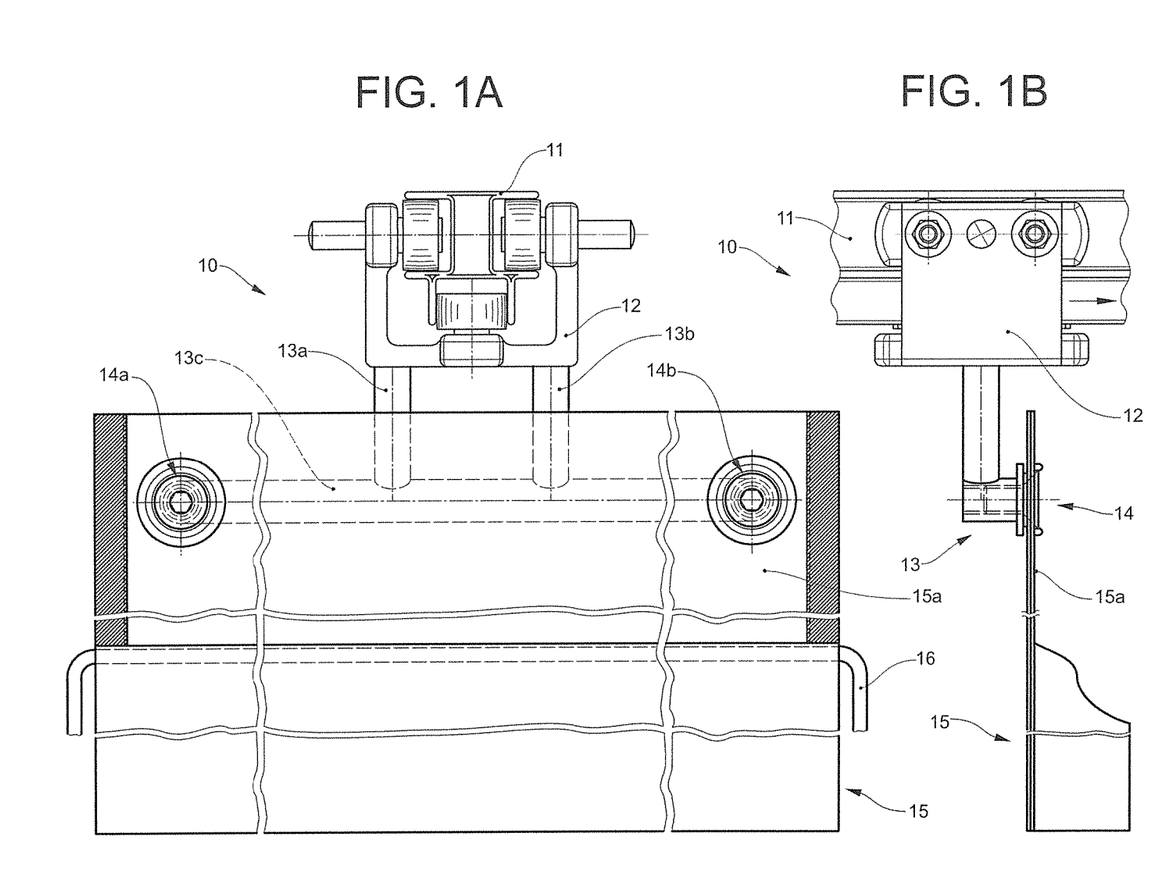
FIG. 1A illustrates a front view of an embodiment of a transport device according to the invention, comprising a carriage guided in a running rail, onto which a transport bag according to an embodiment of the invention is fastened by threaded connection, via a fastening device.
FIG. 1B illustrates a side view of the transport device shown in FIG. 1A.

FIG. 1 depicts two side views (FIG. 1a and FIG. 1b) of an embodiment of a transport device 10 according to the present invention, with a carriage 12 guided in a running rail 11. The carriage 12, which is guided horizontally and vertically on the running rail 11, has attached on the bottom thereof a fastening device 13 that comprises two vertical connecting rods 13a and 13b [and] a cross-member 13c that is fastened to the ends thereof.

Figures 2A, 2B:
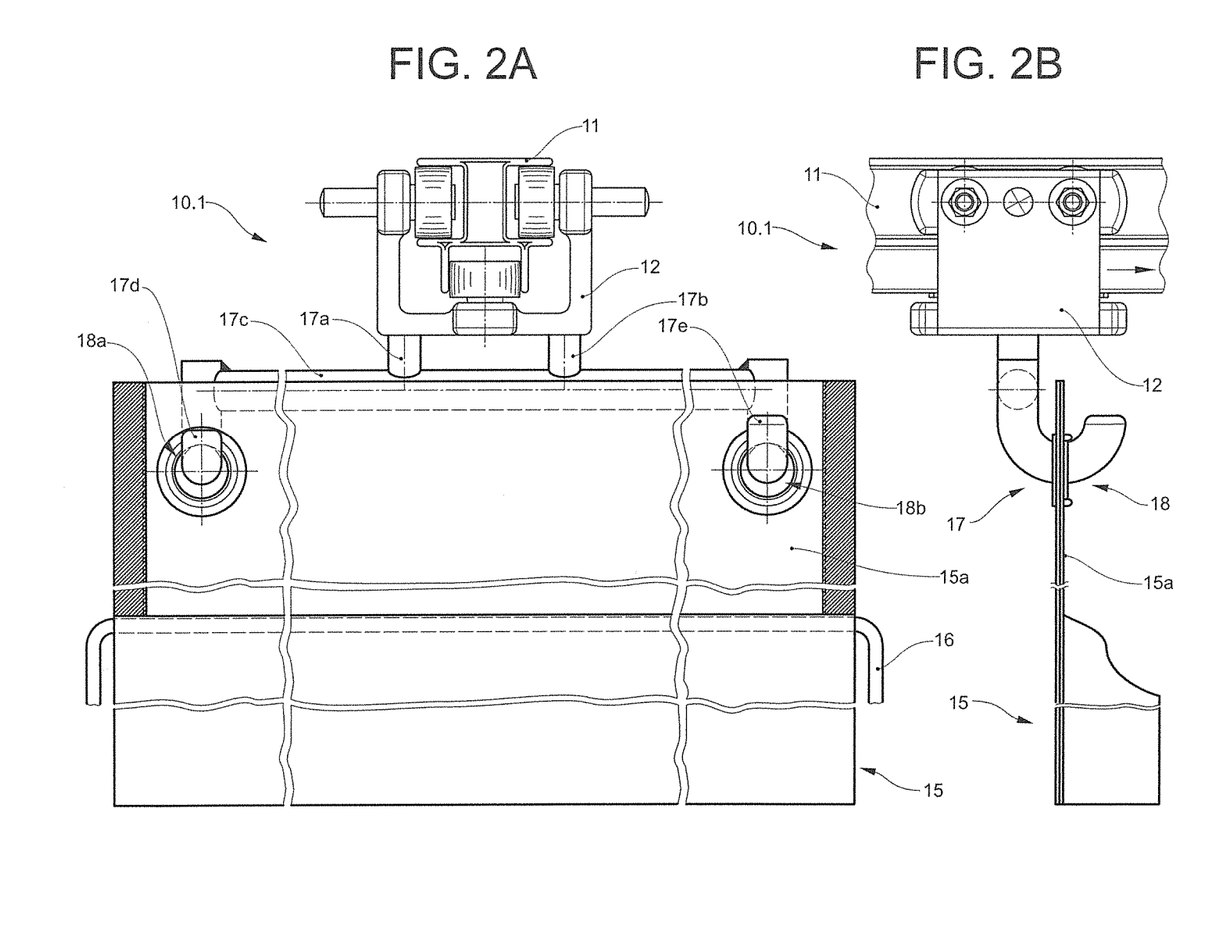
FIG. 2A illustrates a front view of another embodiment of a transport device according to the invention, comprising a carriage guided in a running rail, from which a transport bag according to an embodiment of the invention is removably suspended via a fastening device.
FIG. 2B illustrates a side view of the transport device shown in FIG. 2A.

Above an accommodation space thereof in the extension of a back wall, a transport bag 15 according to an embodiment of the present invention has a support section 15a in which two openings (grommets 18a, 18b in FIG. 2) that are horizontally spaced apart from one another are arranged at the same height. The transport bag 15 is bolted (bolt fastenings 14 or 14a and 14b) by means of these openings to the angled ends of the cross-member 13c, and thus is fixedly connected to the carriage 12. FIG. 1a also depicts an opening bracket 16 that is arranged on the transport bag 15 and, as shall be described in greater detail hereinbelow, plays a crucial role for the functioning of the transport bag 15.

Should the transport bag 15 be removably suspended from, instead of fixedly bolted to, the carriage 12, then the transport device 10.1 in FIG. 2 can be considered as an embodiment. Here, a fastening device 17, which is comparable to the fastening device 13 from FIG. 1, is attached to the carriage 12 that moves along the running rail 11, the fastening device 17 in turn comprising two vertical connecting rods 17a and 17b and a cross-member 17c that is fastened to the ends thereof. Arranged at the ends of the cross-member 17c are support hooks 17d and 17e, which, in this case, are vertically oriented, and in which the transport bag 15 can be removably suspended with the grommets 18a and 18b of the support section 15a.

Figure 9:
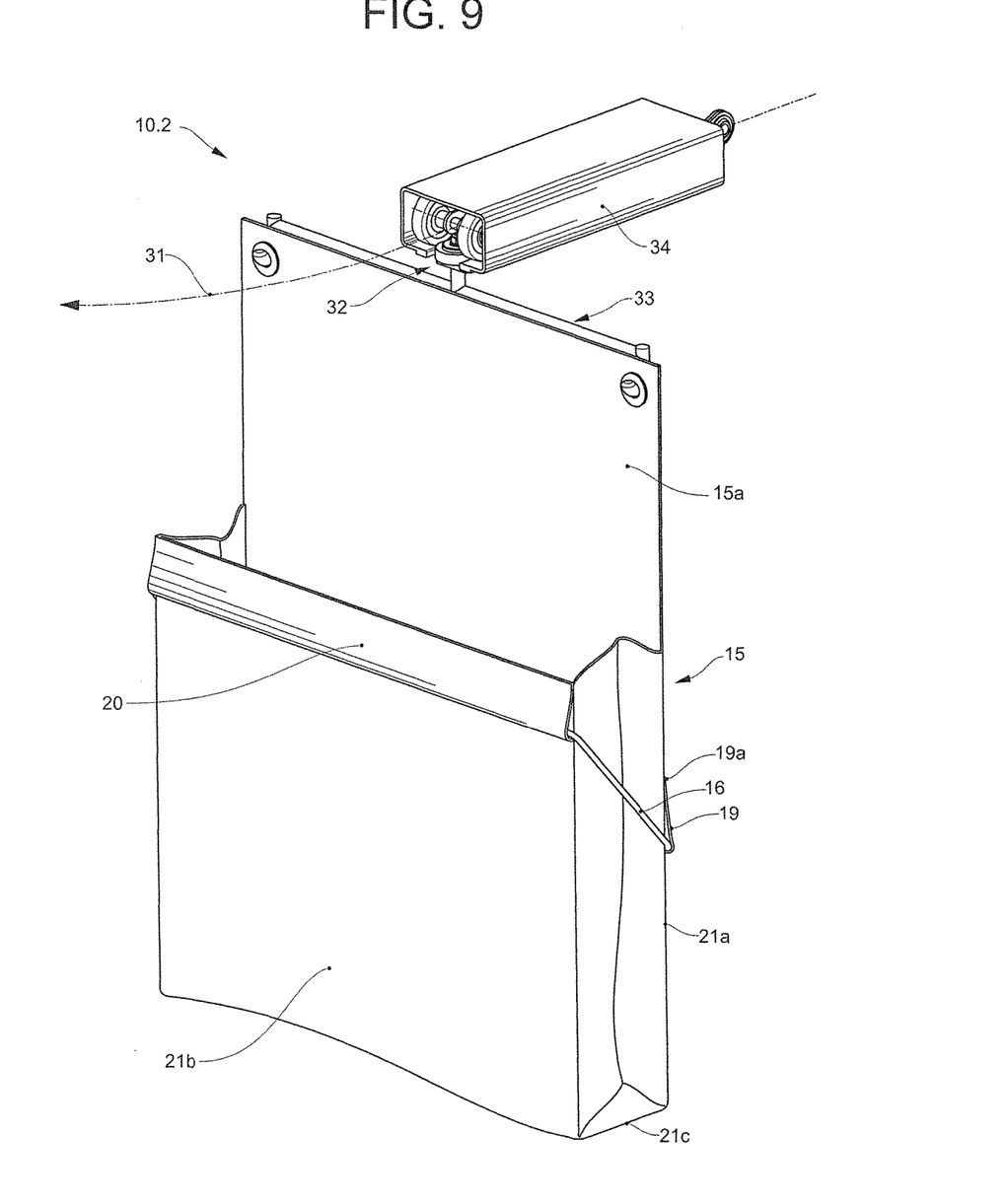
FIG. 9 illustrates a perspective view of another embodiment of a transport device according to the invention, which works with a transport chain that is guided in a guide rail.

FIG. 9 depicts a similar transport device 10.2, with a suspendable transport bag 15. Here, a transport chain 31 equipped with rollers runs in a largely enclosed guide rail 34. The fastening device 33 respectively attached to a chain link 32 of the transport chain 31 is provided in turn with hooks for suspending the transport bag 15 at the ends.

Figure 3A:
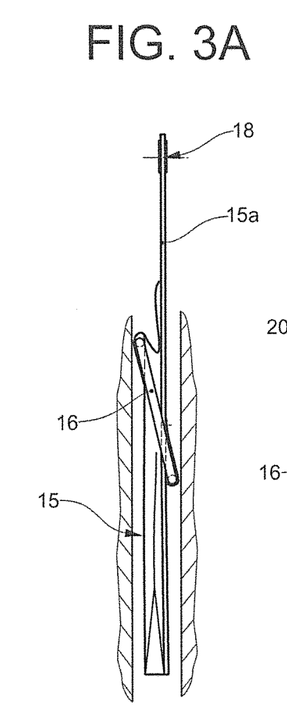
FIG. 3A illustrates a side view of a step of the opening of a transport bag according to an embodiment of the invention, illustrating a closed (completely folded together) bag.
Figures 3B, 3C:
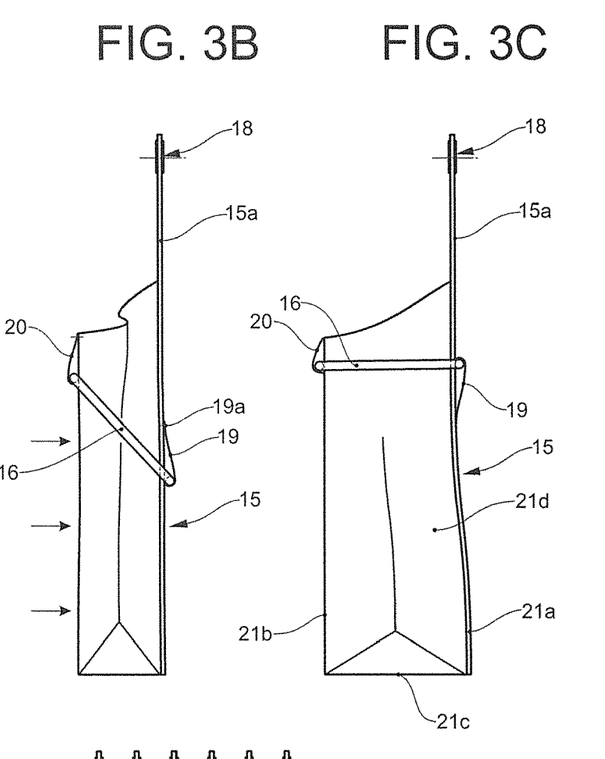
FIG. 3B illustrates a side view of a step of the opening of a transport bag according to an embodiment of the invention, illustrating an open bag.
FIG. 3C illustrates a side view of a step of the opening of a transport bag according to an embodiment of the invention, illustrating a bag that has been opened as far as possible.

The function of the opening bracket 16 on the transport bag 15 is visible, in particular, in FIG. 3, which illustrates different phases of the opening in corresponding partial figures (a) to (c).

As can be seen in FIG. 3(c), the transport bag 15 of this embodiment has a back wall 21a that is extended upward through the support section 15a, as well as a front wall 21b, side walls 21d, and a bottom 21c. A rectangularly curved opening bracket 16 that encompasses the transport bag 15 from the outside is pivotably mounted with considerable vertical clearance onto the back wall 21a and onto the front wall 21b, in corresponding transversely extending tunnel loops 19. In this example, the front tunnel loop 20 arranged on the front wall 21b is fixedly connected to the front wall 21b so as to be unable to fold over. In contrast thereto, the rear tunnel loop 19 arranged on the back wall 21a is attached to the back wall 21a so as to be able to fold over a horizontal axis, as shown by a comparison of FIG. 3(c), in which the tunnel loop 19 is folded upward, with FIG. 3(b), in which the tunnel loop 19 is folded downward. The horizontal folding axis is formed by a fastening seam 19a, with which the tunnel loop 19 is fastened to the back wall 21a.

Figure 7:
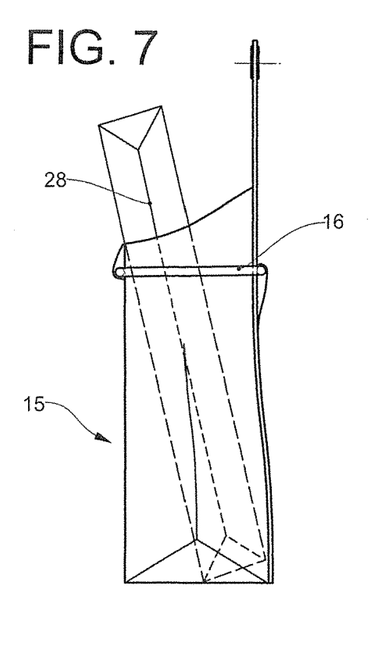
FIG. 7 illustrates a side view of a bag according to FIG. 3, filled with a package.

In FIG. 3(b), the transport bag 15 is opened in order to be filled or emptied by an automatic pivoting of the opening bracket 16 under the force of gravity. In this state, the transport bag 15 can readily accommodate a package 28 or different filling material, as illustrated by way of example in FIG. 7, and then transported. In special cases, the bottom 21c may also be configured so as to be hinged downward or otherwise openable in order for a filled transport bag to be directly emptied downward.

The opening bracket 16 is then pivoted, for example, from a sharply inclined second position depicted in FIG. (3a) into a less inclined first position. The opening bracket may be moved from this first position back into the second position when a force is applied to the front side 21b of the transport bag 15 in accordance with the arrows marked in FIG. 3(b).

In FIG. 3(c), the transport bag 15 is opened as far as possible, for example, by a filling material located in the bag—i.e., the back wall 21a and the front wall 21b are removed the maximum distance apart from one another. The bottom 21c of the transport bag 15 is spread out horizontally, and the side walls 21d, which can be folded inwards, are folded out, while the filling opening of the transport bag 15 that lies above is opened to the maximum extent. The opening bracket 16 is substantially horizontal in this state. This is possible because the lower tunnel loop 19 is fastened to the back wall 21a so as to be foldable over.

If, now, the front wall 21b is displaced by external pressure (arrows) in a parallel manner relative to the back wall 21a, in accordance with FIG. 3(b), then the opening bracket 16 folds upward in the clockwise direction against the force of gravity, until the opening bracket finally reaches the almost-vertical position shown in FIG. 3(a). In FIG. 3(a), then, the transport bag 15 is folded together and is thus reduced to the minimum thickness thereof. The transport bag then fits into a narrow gap between two adjacent walls, as depicted in FIG. 3(a). If these delimitations can be removed again, then the opening bracket 16 automatically folds back into the opening position illustrated in FIG. 3(b) because of the force of gravity, and thus the transport bag 15 opens.

The opening bracket 16 and the mounting thereof on the front and back walls make it thus possible for the transport bag 15 to open automatically, if no other external forces are acting, so that the transport bag 15 can be filled or emptied in a particularly easy manner.

Figure 4:
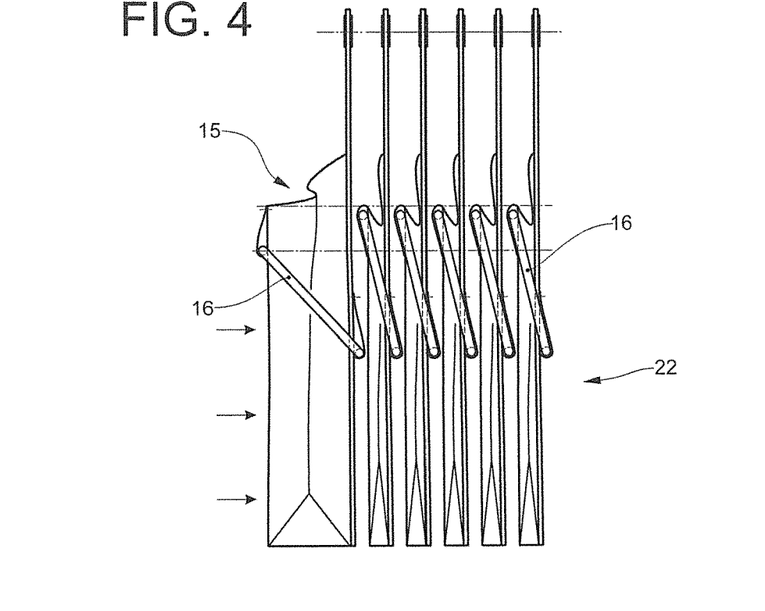
FIG. 4 illustrates an example of a space-saving mounting of bags that are not in use.

If the (plurality of) transport bags 15 of a transport device are not needed, then the transport bags can be stored or kept available in a space-saving manner by simply being pushed together into a (horizontal) stack of bags 22, in accordance with FIG. 4. The opening brackets 16 of the individual transport bags 15 are then pivoted into an approximately vertical position. Adjacent opening brackets 16 can be prevented from disturbing one another due to the arrangement and storage of the opening brackets 16.

Figure 5:
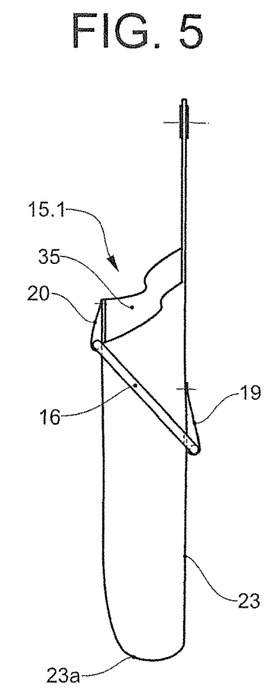
FIG. 5 illustrates an embodiment of a transport bag according to the invention, which is configured in the manner of a laterally open loop.

In the simplest case, an independent bottom and independent side walls can be omitted in the transport bag. This is the case in the embodiment in FIG. 5, where the transport bag 15.1 is configured in the form of a (laterally open) loop 23. Taking the place of the bottom here is a bottom section 23a that is formed by the lower, rounded end of the loop 23. Because the sides are open, the transport bag 15.1 can be laterally filled and/or emptied. So that, due to the missing side walls in this case, the opening bracket 16 does not automatically pivot completely down and so that the transport bag 15.1 closes, the pivoting range is limited by the provision of retaining straps 35 that connect the walls to one another, on opposite sides in the region above the opening bracket 16 between the front wall and the back wall, the retaining straps tightening when the opening bracket 16 is pivoted from the sharply inclined second position into the less inclined first position, and thus limiting the pivoting range.

When a plurality of (filled) transport bags of the type depicted in FIG. 3 are moved in a transport device 10 according to FIG. 1 independently of one another on the running rail 11, it may readily occur that the transport bags run up against one another at a stagnation point, thus causing the front and back walls to collide with one another. If the filling material is sufficiently hard, then this event may result in the occurrence of greater forces that may damage the transport bags and/or the filling material thereof under certain circumstances. In such a case, it is advantageous if each transport bag 15.2 or 15.3 has a protective, in particular, shock-absorbing, cover layer 24 or 25 on the front wall 21b and/or the back wall 21a, in accordance with FIG. 6(a) or 6(b). Such a cover layer may be composed of a flexible foam material, a woven or knitted fabric, a bubble wrap, or distributed air pockets, or the like.

Figures 6A, 6B:
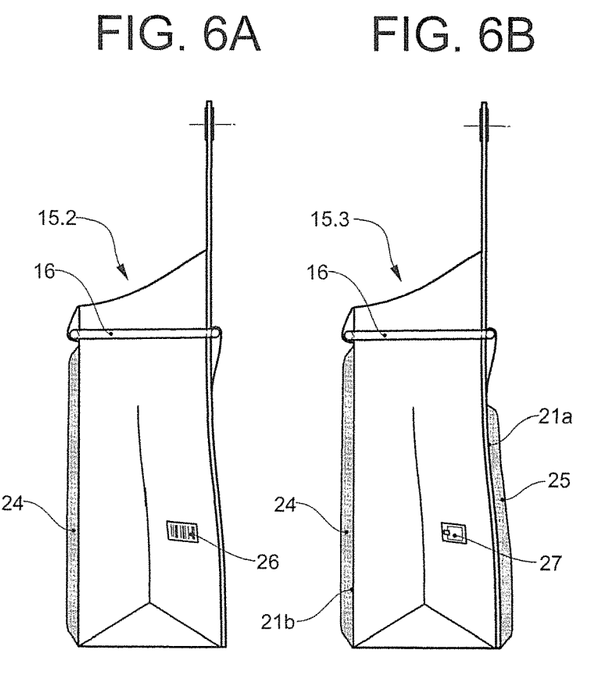
FIG. 6A illustrates an embodiment of a transport bag according to the invention, with which the front side is covered with a protective cover layer.
FIG. 6B illustrates an embodiment of a transport bag according to the invention, with which the front and back sides are covered with a protective cover layer.

It would also be possible to make it possible to identify each transport bag itself and/or the respective contents thereof. For this purpose, the transport bag 15.2 or 15.3 may be equipped with an externally readable information carrier 26 or 27, in accordance with FIG. 6. This may be, for example, an optically readable information carrier such as a label having a barcode or QR code or the like, or an information carrier that can be wirelessly, electronically read out, such as an RFID. Only if the information carrier 26, 27 is readable can the respective transport bag 15.2 or 15.3 be clearly identified therewith. If the information carrier can be read in and read out, then, additionally or alternatively, information about the transported bag contents can be stored thereon.

Figure 10A:
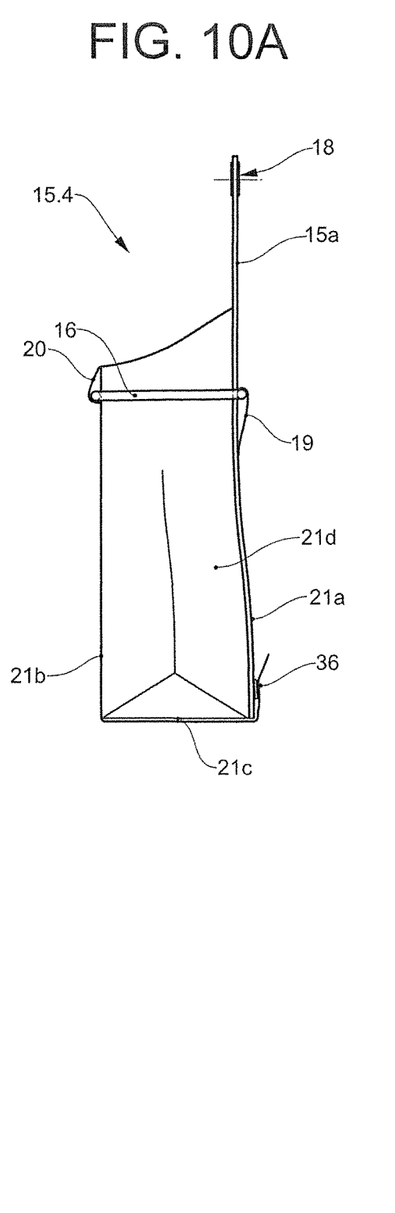
FIG. 10A illustrates a transport bag according to another embodiment of the invention, with a hinged bottom for simplified emptying in the closed state.
Figure 10B:
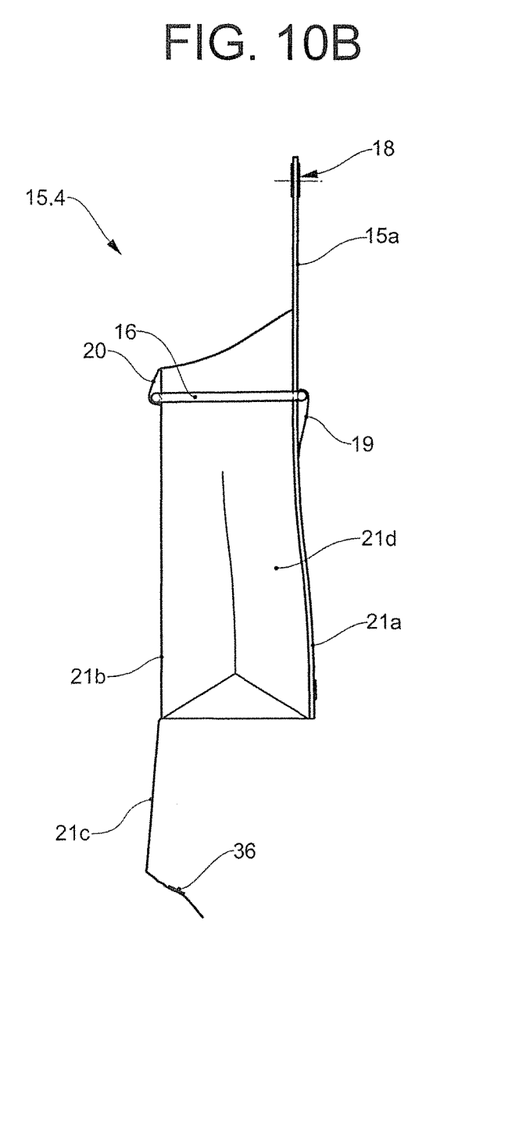
FIG. 10B illustrates a transport bag according to another embodiment of the invention, with a hinged bottom for simplified emptying in the opened state.

In accordance with FIG. 10, it would also be possible to provide a transport bag 15.4 which has a downwardly hinged bottom 21c, in particular, for the purpose of simplified and possibly automated emptying. FIG. 10(a) illustrates the transport bag 15.4 in the closed state, while FIG. 10(b) illustrates the transport bag in the opened state. In the embodiment depicted, the bottom 21c is pivotably articulated with the front longitudinal edge thereof at the lower edge of the front wall 21b. Attached to the lower longitudinal edge of the bottom 21c are (one, or a plurality distributed along the edge) closure tabs 36 that form a hook-and-loop fastener (along with a corresponding counterpart on the back wall 21a). In the closed state (FIG. 10(a)), the closure tabs 36 are folded against the back wall 21a and fixed by the hook-and-loop fastener effect. If the closure tabs 36 are released from the back wall 21a, the bottom 21c can be opened downward (FIG. 10(b)). It shall be readily understood that, conversely, the closure tabs could also be fastened to the back wall (21a). It shall also be readily understood that the bottom 21c could also be pivotably articulated at the lower edge of the back wall 21a. Apart from the embodiment depicted in FIG. 10, it is generally advantageous to have a transport bag that can be opened downward, and on which means for closing this opening are provided.

Figure 8:
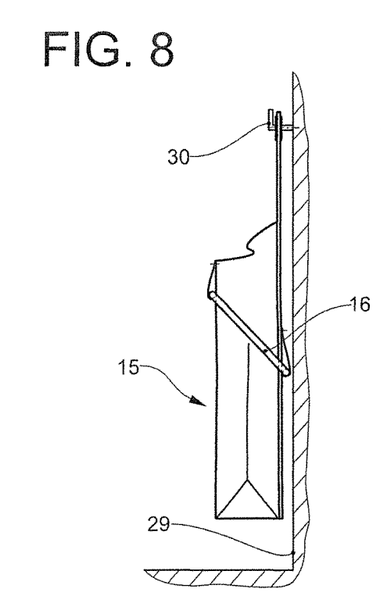
FIG. 8 illustrates the possibility of suspending a single transport bag according to FIG. 3 with or without filling on wall hooks.

Finally, it would also be possible to suspend a single transport bag 15 (with or without filling) on the wall hooks 30 of a wall 29, in accordance with FIG. 8, in order to separately temporarily store the bag as such, or the filling thereof.

It is claimed:

1. A transport bag (15, 15.1, 15.2, 15.3, 15.4) for transporting and/or storing articles, comprising:

a front wall (21b) and a back wall (21a) that are flexibly connected to one another via a bottom section (21c; 23a) to form an opening (16, 19, 20) so as to be movable back and forth between a first configuration in which the front wall and back wall form an upwardly open bag that can be filled from above, and a second configuration in which the front wall and back wall lie alongside one another and form a bag that is folded together, wherein the opening (16, 19, 20) comprises an opening bracket (16) that connects the back wall (21a) and the front wall (21b) to one another and is mounted so as to be pivotable on the back wall (21a) and on the front wall (21b), respectively, wherein the back wall (21a) is extended upward above and beyond the height of the front wall (21b) with a support section (15a) for fastening the transport bag (15, 15.1, 15.2, 15.3, 15.4) to a transport device (10, 10.1, 10.2), wherein the opening (16, 19, 20) is provided that automatically brings the transport bag (15, 15.1, 15.2, 15.3, 15.4) into the first configuration and keeps the transport bag in the first configuration, and allows a deliberate shift from the first configuration into the second configuration.

2. The transport bag according to claim 1, wherein the opening bracket (16) that connects the back wall (21a) and the front wall (21b) to one another is mounted in such a manner as to be pivoted, originating from the second configuration, from an inclined second position into a less inclined first position due to a weight of the opening bracket, thereby bringing the transport bag (15, 15.1, 15.2, 15.3, 15.4) into the first configuration and keeping the transport bag in the first configuration.

3. The transport bag according to claim 2, wherein the opening bracket (16) is guided outward around the transport bag (15, 15.1, 15.2, 15.3, 15.4) and mounted onto the outside of the back wall (21a) and onto the outside of the front wall (21b), respectively, so as to be pivotable in a transverse tunnel loop (19, 20).

4. The transport bag according to claim 3, wherein the opening bracket (16) is configured as a rectangular, dimensionally stable metal bracket.

5. The transport bag according to claim 3, wherein the opening bracket (16) is mounted so as to be vertically movable in the tunnel loop (19, 20).

6. The transport bag according to claim 3, wherein at least one tunnel loop (19, 20) is configured so as to be foldable about a horizontal axis (19a).

7. The transport bag according to claim 1, wherein the transport bag (15, 15.2, 15.3, 15.4) is closed laterally by side walls (21d) and includes a bottom (21c) as a bottom section.

8. The transport bag according to claim 1, wherein the transport bag (15.4) is openable downward, and further comprising closure tabs for closing a resulting downward opening.

9. The transport bag according to claim 8, wherein the transport bag (15.4) is closed laterally by side walls (21d), and includes a bottom (21c) as a bottom section, wherein the bottom (21c) of the transport bag (15.4) is configured so as to be hinged downward, and wherein one or more closure tabs (36) with which the bottom (21c) can be fixed in the closed state is/are provided.

10. The transport bag according to claim 1, wherein the transport bag (15.1) is formed by a laterally open loop (23), which forms a bottom section (23a) in the lower region.

11. The transport bag according to claim 10, further comprising retaining straps (35) on opposite sides in the region above the opening bracket (16), the retaining straps connecting front and back walls of the loop (23) and delimiting the pivoting movement of the opening bracket (16).

12. The transport bag according to claim 1, wherein the transport bag (15.2, 15.3) includes a protective, shock-absorbing, cover layer (24, 25) on the front wall (21b) and/or the back wall (21a).

13. The transport bag according to claim 1, wherein the transport bag (15.2, 15.3) is equipped with an externally readable information carrier (26, 27).

14. The transport bag according to claim 1, wherein the support section (15a) of the transport bag (15, 15.1, 15.2, 15.3, 15.4) includes at least one fastening opening (18, 18a, 18b).

15. The transport bag according to claim 14, further comprising two grommets (18a, 18b) that are at the same height and are spaced apart from one another as other fastening openings of the at least one fastening opening (18, 18a, 18b).

16. The transport bag according to claim 1, wherein the transport bag (15, 15.1, 15.2, 15.3, 15.4) is made of a flexible, fabric-reinforced material.

17. A transport device (10, 10.1, 10.2) having one or more transport bags (15, 15.1, 15.2, 15.3, 15.4) according to claim 1, wherein the one or more transport bags (1.5, 15.1, 15.2, 15.3, 15.4) are moveable along a transport path while suspended with the support section (15a) on a carriage (12) in a running rail (11) or on a transport chain (31).

18. The transport device according to claim 17, wherein the one or lore transport bags (15, 15.1, 15.2, 15.3, 15.4) are fastened to the carriage (12) or to the transport chain (31) at at least two points (18a, 18b) spaced apart horizontally from one another.

19. The transport device according to claim 18, wherein the one or more transport bags (15, 15.1, 15.2, 15.3, 15.4) are removably fastened to the carriage (12) or to the transport chain (31) at the at least two points (18a, 18b) spaced apart horizontally from one another via a fastening device (17, 17a, 17b, 17c, 17d, 17e; 33).

* * * * *